(12) United States Patent
Asai

(10) Patent No.: US 10,302,943 B2
(45) Date of Patent: May 28, 2019

(54) HEAD-UP DISPLAY AND MOVING BODY COMPRISING HEAD-UP DISPLAY

(71) Applicant: Panasonic Intellectual Property Management Co., Ltd., Osaka (JP)

(72) Inventor: Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 17 days.

(21) Appl. No.: 15/839,489

(22) Filed: Dec. 12, 2017

(65) Prior Publication Data

US 2018/0101007 A1    Apr. 12, 2018

Related U.S. Application Data

(63) Continuation of application No. PCT/JP2016/003053, filed on Jun. 24, 2016.

(30) Foreign Application Priority Data

Jul. 1, 2015    (JP) .................................. 2015-132282

(51) Int. Cl.
    *G02B 27/01*    (2006.01)
    *B60K 35/00*    (2006.01)
    (Continued)

(52) U.S. Cl.
    CPC .......... *G02B 27/0101* (2013.01); *B60K 35/00* (2013.01); *G02B 27/0093* (2013.01);
    (Continued)

(58) Field of Classification Search
    CPC .............................................. G02B 27/0101
    See application file for complete search history.

(56) References Cited

U.S. PATENT DOCUMENTS 5,714,967 A * 2/1998 Okamura ............. G02B 27/017
                                                      345/8
2006/0274287 A1   12/2006 Heeman et al.
(Continued)

FOREIGN PATENT DOCUMENTS

JP     11-231316    8/1999
JP     2007-108429    4/2007
(Continued)

OTHER PUBLICATIONS

European search report (under R.61 or R.63 EPC) or the supplementary european search report (Art.153(7) EPC) dated Feb. 12, 2018 for the related European Patent Application No. 16817455.5.
(Continued)

*Primary Examiner* — Joseph P Martinez
(74) *Attorney, Agent, or Firm* — Greenblum & Bernstein, P.L.C.

(57) ABSTRACT

A head-up display projects an image onto an eye-box of an observer. The head-up display includes a plurality of light source elements, liquid crystal panel, first lens, viewpoint detector, and controller. The plurality of light source elements are arranged into an array shape to output light beams. Liquid crystal panel displays the image, and first lens deflects the light beams emitted from the plurality of light source elements such that an identical region in an incident plane of liquid crystal panel is illuminated with the light beams. Viewpoint detector detects a viewpoint position of the observer. Controller controls light intensity of the light source elements according to the viewpoint position detected by viewpoint detector.

8 Claims, 11 Drawing Sheets

(51) Int. Cl.
*G06F 3/01* (2006.01)
*G02B 27/00* (2006.01)
*G09F 9/00* (2006.01)
*G09G 3/20* (2006.01)
*G09G 5/00* (2006.01)

(52) U.S. Cl.
CPC ......... *G02B 27/0179* (2013.01); *G06F 3/013* (2013.01); *B60R 2300/205* (2013.01); *B60R 2300/602* (2013.01); *B60R 2300/605* (2013.01); *G02B 2027/014* (2013.01); *G02B 2027/0118* (2013.01); *G02B 2027/0134* (2013.01); *G02B 2027/0136* (2013.01); *G02B 2027/0181* (2013.01); *G02B 2027/0187* (2013.01); *G02B 2027/0196* (2013.01); *G09F 9/00* (2013.01); *G09G 3/20* (2013.01); *G09G 5/00* (2013.01)

(56) References Cited

U.S. PATENT DOCUMENTS

| | | |
|---|---|---|
| 2008/0002262 A1 | 1/2008 | Chirieleison |
| 2012/0235885 A1 | 9/2012 | Miller et al. |
| 2012/0274556 A1 | 11/2012 | Suglyama et al. |

FOREIGN PATENT DOCUMENTS

| | | |
|---|---|---|
| JP | 2011-059270 A | 3/2011 |
| JP | 2011-158733 | 8/2011 |

OTHER PUBLICATIONS

International Search Report of PCT application No. PCT/JP2016/003053 dated Sep. 13, 2016.

\* cited by examiner

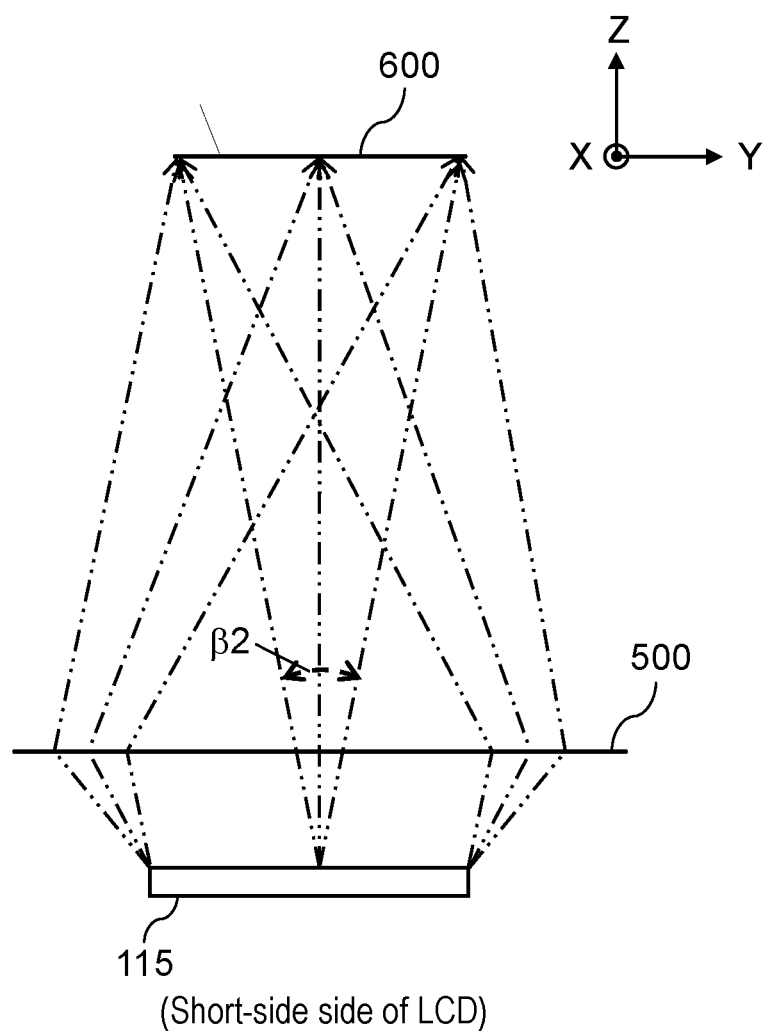

HEAD-UP DISPLAY AND MOVING BODY COMPRISING HEAD-UP DISPLAY

TECHNICAL FIELD

The present disclosure relates to a head-up display that displays an image in order to cause a driver to visually recognize a virtual image.

BACKGROUND ART

PTL 1 discloses a head-up display, which performs transmitted illumination of a liquid crystal panel while homogenizing a light beam emitted from a light source behind the liquid crystal panel. The head-up display includes a light source (light emitting diode), a first condenser lens, a diffuser, and a second condenser lens. The second condenser lens condenses the light beam emitted from the light source into the diffuser. Therefore, luminance uniformity can be reduced while degradation of the luminance of an illumination light beam transmitted through a display is suppressed.

CITATION LIST

Patent Literature

PTL 1: Unexamined Japanese Patent Publication No. 2007-108429

SUMMARY OF THE INVENTION

According to a first aspect of the present disclosure, a head-up display projects an image onto an eye-box of an observer. The head-up display includes a plurality of light source elements, a transmission type display element, an optical member, a viewpoint detector, and a controller. The plurality of light source elements are arranged into an array shape to output light beams. The transmission type display element displays the image. The optical member deflects the light beams emitted from the plurality of light source elements such that an identical region in an incident plane of the transmission type display element is illuminated with the light beams. The viewpoint detector detects view positions of the observer. The controller controls light intensity of the light source elements according to the viewpoint position detected by the viewpoint detector.

According to a second aspect of the present disclosure, a moving body (such as an automobile, a railroad vehicle, an airplane, and a vessel) including the above-described head-up display is provided.

In the head-up display of the present disclosure, lighting of the light source is controlled according to the eye position of the observer, and power saving can be achieved.

BRIEF DESCRIPTION OF DRAWINGS

FIG. 3B is a view illustrating the optical paths (the optical path viewed from an X-axis direction) of the head-up display of the first exemplary embodiment.

DESCRIPTION OF EMBODIMENT

Hereinafter, exemplary embodiments will be described in detail with reference to the drawings as appropriate. However, detailed description more than necessary may be omitted. For example, detailed description of a known matter or repetitive description of a substantially identical configuration may be omitted. Such omissions are aimed to prevent the following description from being redundant more than necessary, and to help those skilled in the art easily understand the following description. Note that the attached drawings and the following description are provided for those skilled in the art to fully understand the present disclosure, and are not intended to limit the subject matter as described in the appended claims.

In the head-up display of PTL 1, the light beam emitted from the light source (light emitting diode) is condensed into the diffuser using the second condenser lens. Specifically, a plurality of lenses provided in the second condenser lens receive light beams from a plurality of light sources (light emitting diodes), respectively, and the light beams are output to the diffuser. That is, one lens receives the light beam from one light source. Therefore, luminance uniformity is generated near a boundary of a region irradiated with the light beams emitted from adjacent lenses in the condenser lens when the light beam emitted from each lens of the condenser lens is incident on the diffuser. Additionally, because of a configuration in which one light source illuminates a part of a display element, the light beams from all the light source elements reach a whole region of the eye-box irrespective of positions of driver's eyes. In other words, the light beams of the light sources are incident on a portion except for the positions of the driver's eyes on the eye-box, and a large amount of wasted light beam exists.

First Exemplary Embodiment

Hereinafter, a first exemplary embodiment will be described with reference to the accompanying drawings.

[1-1. Configuration]

[1-1-1. Entire Configuration]

Figure 1:
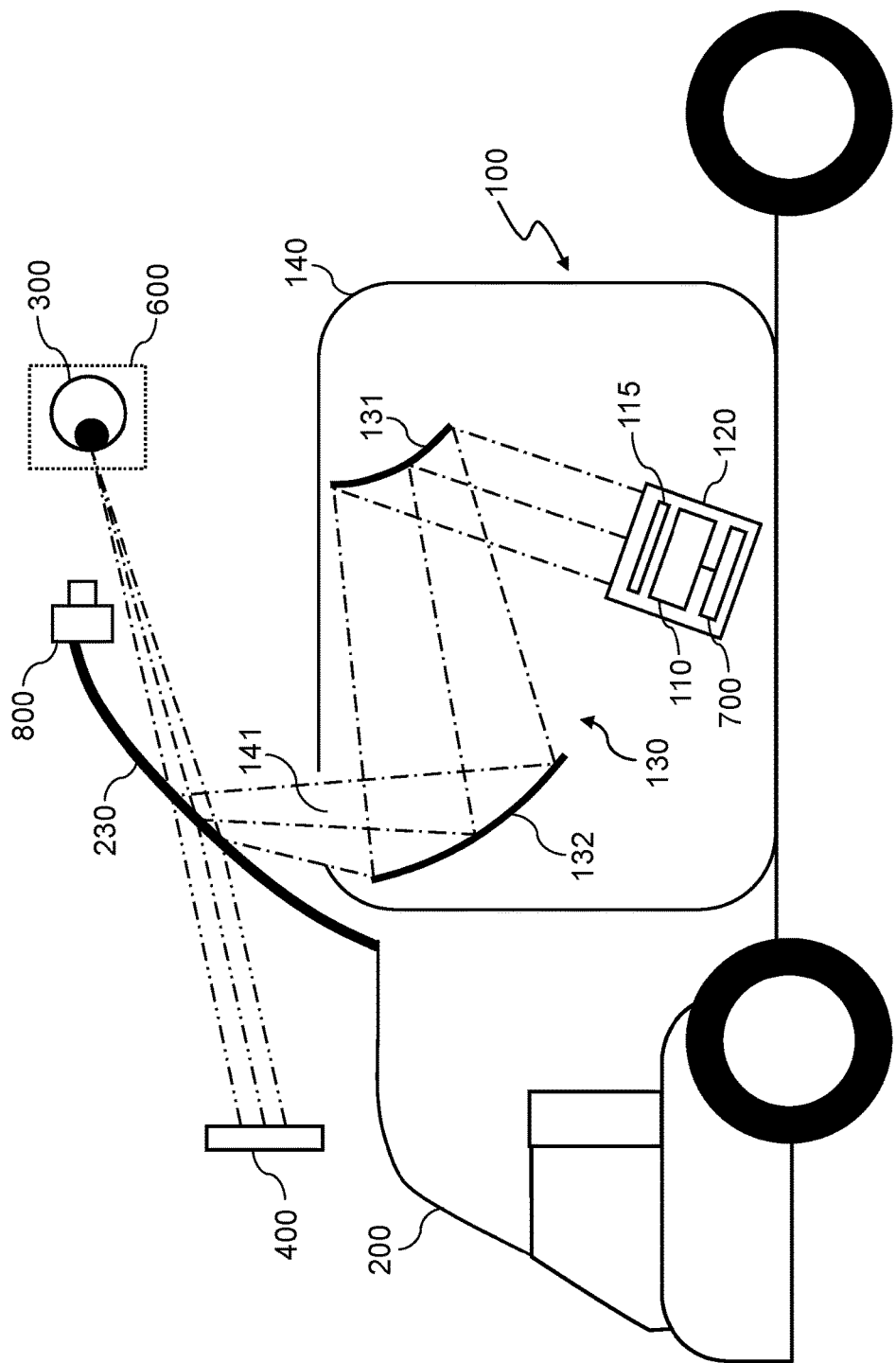
FIG. 1 is a schematic diagram illustrating a vehicle in which a head-up display according to a first exemplary embodiment is mounted.

FIG. 1 is a view illustrating a configuration of a head-up display mounted on a vehicle in the first exemplary embodiment. Head-up display 100 is mounted on vehicle 200 (an example of a moving body) including windshield 230. Head-up display 100 is constructed with display unit 120, reflection optical unit 130, housing 140, and viewpoint detector 800. Display unit 120 includes illumination device 110, liquid crystal panel 115, and controller 700.

Head-up display 100 projects an image onto windshield 230 in order to cause observer 300 to visually recognize virtual image 400.

Illumination device 110 illuminates liquid crystal panel 115 that is of a display device. Liquid crystal panel 115 displays an image of a speedometer or a numerical value indicating speed, for example. Liquid crystal panel 115 acts as a spatial light modulation element that modulates light beams from illumination device 110 using the displayed image. The modulated light beams are output from liquid crystal panel 115 as transmitted light beams. The transmitted light beams are guided into eye-box 600 of observer 300 through reflection optical unit 130 and windshield 230, and visually recognized as virtual image 400 by observer 300. For example, observer 300 can visually recognize the image such as the speedometer as virtual image 400. As used herein, the eye-box means a region where virtual image 400 can visually be recognized by observer 300 without any omission of virtual image 400.

Reflection optical unit 130 (an example of an optical element) includes first mirror 131 and second mirror 132. First mirror 131 reflects the light beams outgoing from liquid crystal panel 115 toward second mirror 132. Second mirror 132 reflects the light beams from first mirror 131 toward windshield 230. Second mirror 132 has a concave reflection surface. Reflection optical unit 130 is not always necessarily constructed with two mirrors, but may be constructed with one mirror or at least three mirrors. A refraction optical system such as a lens may further be disposed on an optical path of reflection optical unit 130.

Housing 140 of head-up display 100 accommodates display unit 120 and reflection optical unit 130, and opening 141 through which the light beams from reflection optical unit 130 are output. A transparent cover may be provided in opening 141.

Controller 700 is a processor that controls illumination device 110 or liquid crystal panel 115. Controller 700 controls head-up display 100 based on information from viewpoint detector 800.

Viewpoint detector 800 is provided in vehicle 200, and is a device that detects positions of right and left eyes of observer 300. For example, viewpoint detector 800 is an imaging device such as a camera or a sensor using an infrared light beam.

[1-1-2. Configuration of Display Unit]

Figure 2:
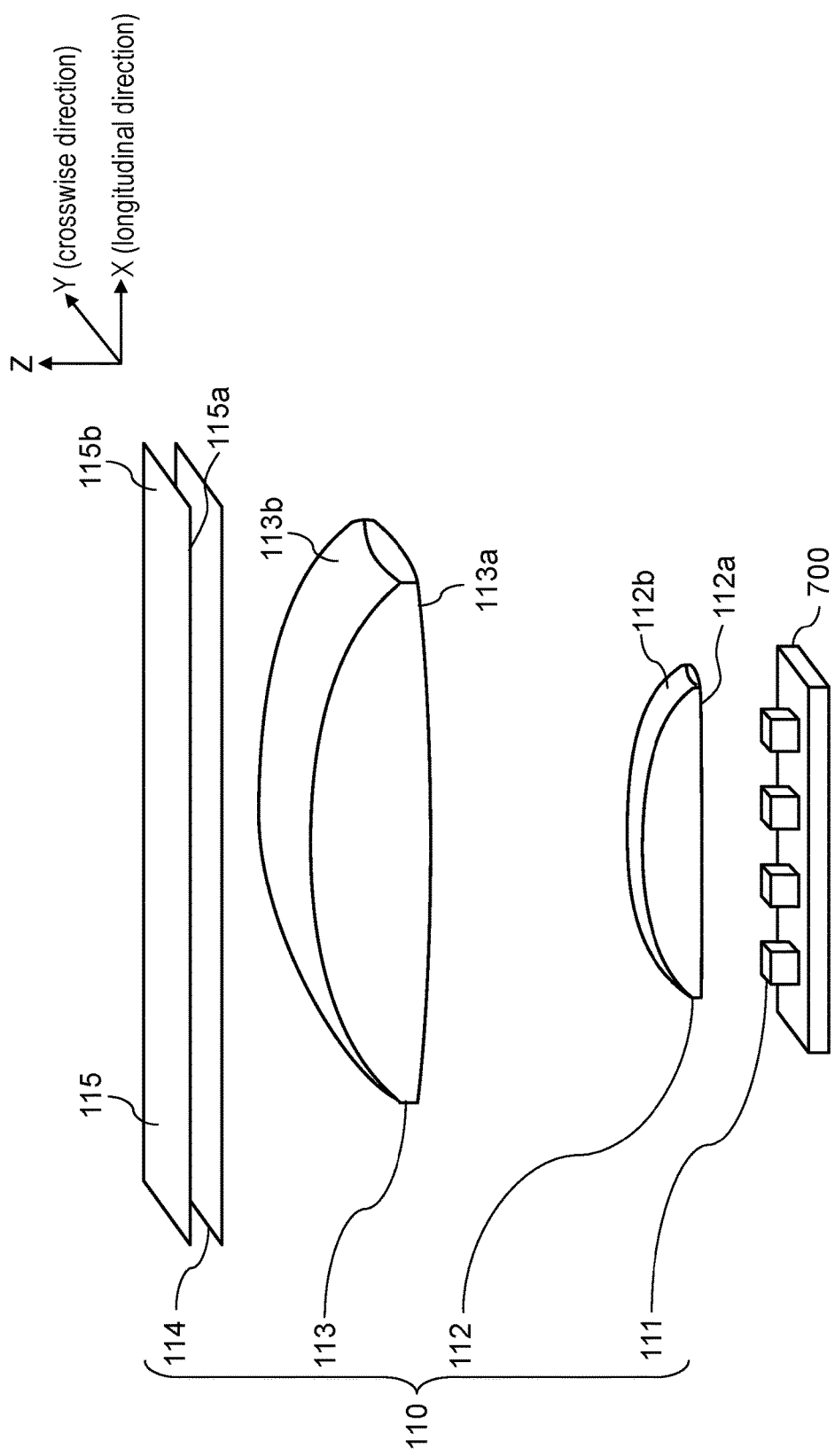
FIG. 2 is a view illustrating a configuration of a display unit in the head-up display of the first exemplary embodiment.

FIG. 2 is a view illustrating a detailed configuration of display unit 120. Display unit 120 includes illumination device 110, liquid crystal panel 115, and controller 700. Liquid crystal panel 115 includes incident plane 115a on which the light beams are incident and outgoing plane 115b from which the light beams are output. Incident plane 115a and outgoing plane 115b have an identical shape, and a rectangular shape.

In the following description, a three-dimensional orthogonal coordinate system is set in each of the drawings. That is, an X-axis is set to a direction parallel to a longitudinal direction of incident plane 115a and outgoing plane 115b in liquid crystal panel 115, a Y-axis is set to a direction parallel to a crosswise direction of incident plane 115a and outgoing plane 115b, and a Z-axis is set to a direction parallel to a normal direction of incident plane 115a and outgoing plane 115b.

As illustrated in FIG. 2, illumination device 110 is constructed with a plurality of light source elements 111, first lens 112 disposed in an outgoing direction of light source element 111, second lens 113 disposed in an outgoing direction of first lens 112, and diffuser 114 (an example of a diffusion member) disposed in an outgoing direction of second lens 113.

For example, each of light source elements 111 is a chip type light emitting diode (LED), and is a luminous body that supplies an illumination light beam to liquid crystal panel 115. The plurality of light source elements 111 are arranged in line in the longitudinal direction (the X-direction in FIG. 3).

First lens 112 is disposed close to light source elements 111 to an extent in which the outgoing light beam of each light source element 111 does not leak. First lens 112 takes in the outgoing light beam of each light source element 111 from incident plane 112a. First lens 112 has a function of outputting the divergent light beams of light source elements 111 while deflecting the divergent light beams into substantially parallel light beams in the Y-direction. Only one first lens 112 is disposed with respect to the plurality of light source elements 111.

At least one of incident plane 112a and outgoing plane 112b of first lens 112 has a convex shape such that first lens 112 has positive refractive power. The convex shapes of incident plane 112a and outgoing plane 112b of first lens 112 are not necessarily rotational symmetry with respect to an optical axis, but may be a toroidal shape in which the X-direction and the Y-direction differ from each other in a curvature. In the first exemplary embodiment, first lens 112 is a plano-convex lens in which only outgoing plane 112b has a convex shape.

Outgoing plane 112b of first lens 112 is a convex plane having an aspherical shape in which the X-axis direction and the Y-axis direction differ from each other in a curvature. The X-axis direction of outgoing plane 112b has a shape in which the curvature is decreased from a center to an end (that is, a curvature radius is increased) such that an illuminance distribution becomes even on diffuser 114 of the outgoing light beam of each light source element 111. The Y-axis direction of outgoing plane 112b has a shape in which the curvature at the end is smaller than that in the central portion such that the illuminance distribution becomes even on diffuser 114.

Second lens 113 has a function of deflecting the outgoing light beams of first lens 112 in a desired direction. In the first exemplary embodiment, incident plane 113a of second lens 113 has a shape in which only incident plane 113a in the X-axis direction is convex. Outgoing plane 113b of second lens 113 has a convex shape in which the X-axis direction and the Y-axis direction differ from each other in a curvature. Incident plane 113a of second lens 113 may have a convex shape in which the X-axis direction and the Y-axis direction differ from each other in a curvature. Outgoing plane 113b of second lens 113 may have a shape in which one of the X-axis and the Y-axis direction is convex. The refractive power of second lens 113 is set according to an outgoing angle of the outgoing light beams at the end of display unit 120 (or an incident angle of the light beams incident on diffuser 114). Second lens 113 is not always necessarily provided. A desired outgoing angle can be obtained at the end of the display unit 120 only with first lens 112 with no use of second lens 113 by lengthening a distance between first lens 112 and diffuser 114.

First lens 112 and second lens 113 are made of a transparent material having a predetermined refractive index. The refractive index of the transparent material ranges from 1.4 to 1.6, for example. Epoxy resin, silicone resin, acrylic resin, and resin such as polycarbonate can be used as the transparent material. In the first exemplary embodiment, the polycarbonate is used in consideration of a heat-resistant property.

Diffuser 114 diffuses the light beams deflected by first lens 112 and second lens 113, and outputs the light beams to liquid crystal panel 115. Therefore, the luminance uniformitycan be reduced in a video light beam, which is visually recognized in eye-box 600 and generated by the plurality of light source elements 111. Diffuser 114 may be an optical member having a function of diffusing the light beams. For example, a surface of diffuser 114 is constructed with a bead material, a fine irregular structure, or a roughened surface. Furthermore, a dot sheet or a permeable, milky-white sheet may be used as diffuser 114.

Controller 700 controls lighting of the plurality of light source elements 111 based on information about viewpoint detector 800 or liquid crystal panel 115. For example, controller 700 is constructed with a microcomputer.

[1-1-3. Optical Paths in Head-Up Display]

Optical paths of the light beams emitted from light source elements 111 of head-up display 100 of the first exemplary embodiment will be described below.

Figure 3A:
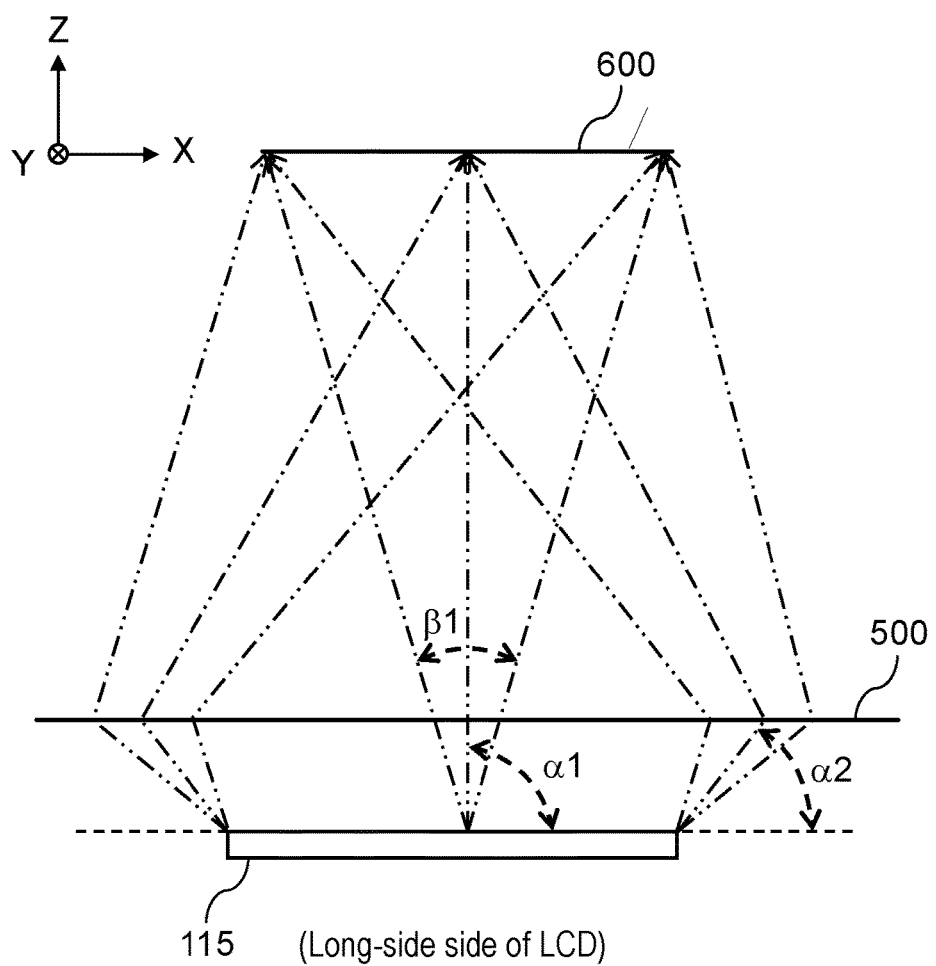
FIG. 3A is a view illustrating optical paths (the optical paths viewed from a Y-axis direction) of the head-up display of the first exemplary embodiment.

Each of FIGS. 3A and 3B is a view illustrating the optical paths from liquid crystal panel 115 in head-up display 100 to eye-box 600. Observer 300 visually recognizes the transmitted light beams of liquid crystal panel 115 through virtual image optical system 500. Virtual image optical system 500 is a combination of reflection optical unit 130 and windshield 230 in FIG. 1. FIG. 3A illustrates the optical paths when the optical path is viewed from a long-side side of liquid crystal panel 115, and FIG. 3B illustrates the optical paths when the optical path is viewed from a short-side side of liquid crystal panel 115.

In the case that liquid crystal panel 115 is disposed such that incident plane 115a of liquid crystal panel 115 becomes parallel to the outgoing plane of illumination device 110, the outgoing angles of the outgoing light beams from liquid crystal panel 115 toward the central portion of eye-box 600 vary in the central portion and the end of liquid crystal panel 115. Specifically, outgoing angle α1 in the central portion of liquid crystal panel 115 is larger than outgoing angle α2 at the end of liquid crystal panel 115. That is, the outgoing light beam in the central portion of liquid crystal panel 115 is output in the normal direction of outgoing plane 115b of liquid crystal panel 115, and the outgoing light beam at the end is output toward the outside of outgoing plane 115b of liquid crystal panel 115. Unless liquid crystal panel 115 is disposed in parallel to illumination device 110, the outgoing light beam in the central portion has an inclination with respect to the normal direction of outgoing plane 115b of liquid crystal panel 115. In eye-box 600, because a length in the X-direction is generally longer than a length in the Y-direction, light distribution angle β1 (see FIG. 3A) in the X-axis direction is larger than light distribution angle β2 (see FIG. 3B) in the Y-axis direction.

Figure 4A:
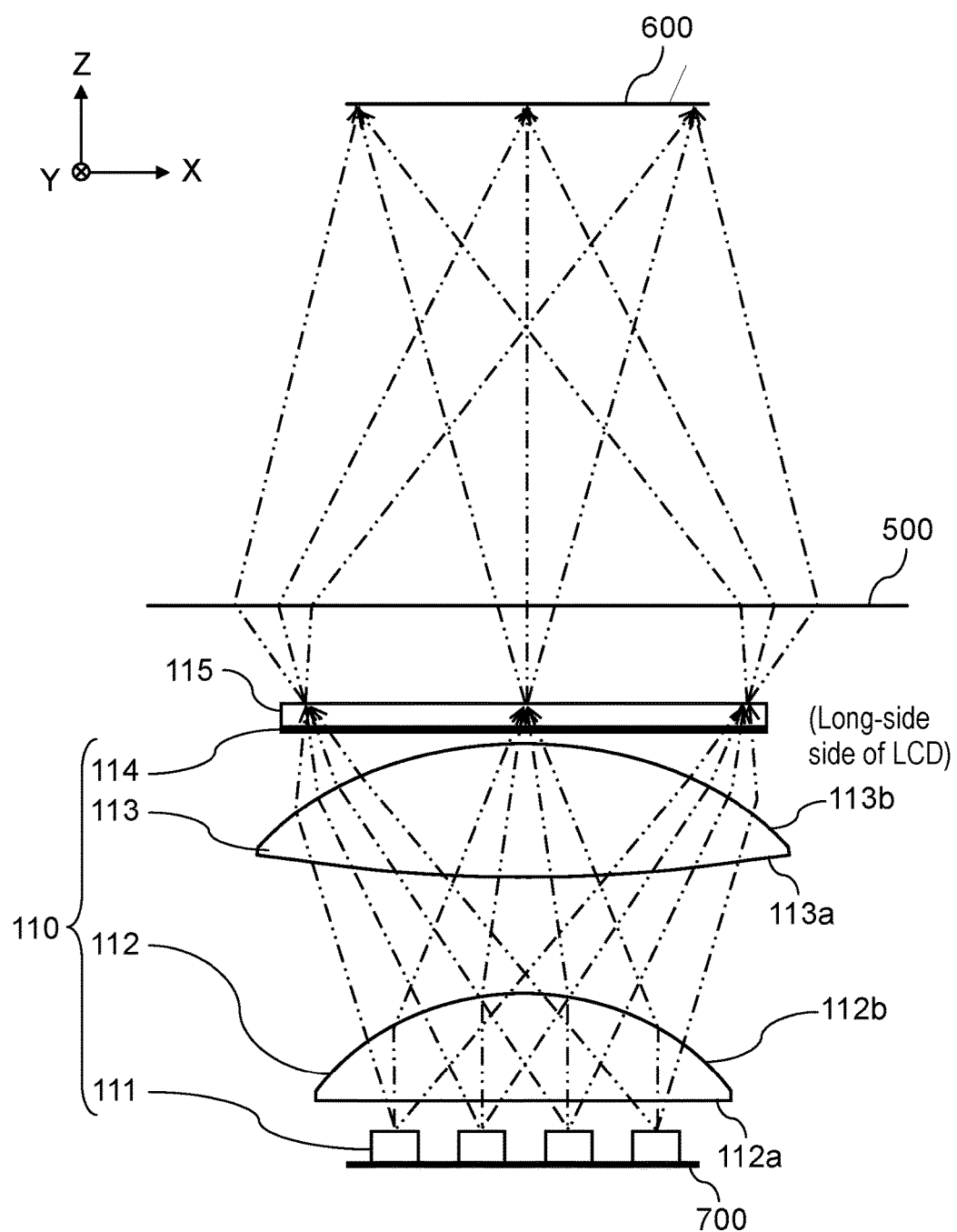
FIG. 4A is a view illustrating the optical paths when the optical paths are viewed from the Y-axis direction in the first exemplary embodiment.

FIG. 4A is a view illustrating the optical paths from light source elements 111 to eye-box 600 when the optical paths are viewed from the Y-axis direction. First lens 112 deflects the outgoing light beam from each light source element 111 such that outgoing light beams from the plurality of light source elements 111 are superposed at the position of diffuser 114.

Figure 4B:
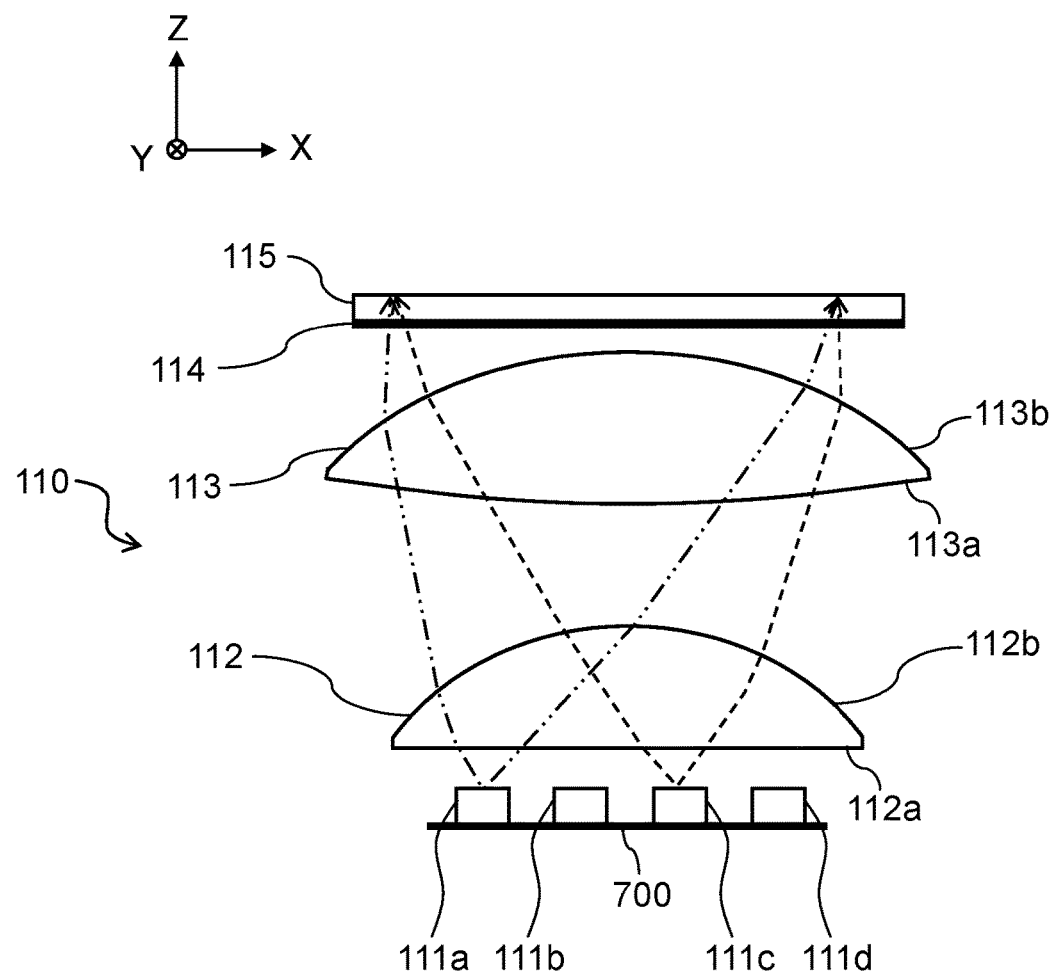
FIG. 4B is a view illustrating superposition of optical paths (the optical paths viewed from the X-axis direction) of light source elements.

That is, the refractive power of first lens 112 is set such that each of the plurality of light source elements 111 illuminates the whole surface of liquid crystal panel 115 when first lens 112 is viewed from the Y-axis direction. For example, as illustrated in FIG. 4B, both the outgoing light beam from light source element 111a and the outgoing light beam from light source element 111c illuminate the whole region of liquid crystal panel 115. The same holds true for light source elements 111b, 111d.

Thus, the light beams from the plurality of light source elements 111 illuminate the whole (identical region) of liquid crystal panel 115 while being superposed on each other. Therefore, virtual image 400 visually recognized in eye-box 600 has even luminance.

A focal length of first lens 112 is set such that outgoing light beams from light source elements 111a to 111d illuminate the identical region of liquid crystal panel 115 while being superposed on each other. Specifically, first lens 112 is designed such that the focal length of first lens 112 becomes identical to a distance from an optical center of first lens 112 to liquid crystal panel 115.

The focal length of first lens 112 may be set to a value larger than the distance from the optical center of first lens 112 to liquid crystal panel 115 as long as the substantially identical region of liquid crystal panel 115 is illuminated with the outgoing light beams emitted from the plurality of light source elements 111 while the outgoing light beams are superposed on each other.

Second lens 113 is used in order to adjust the incident angles from first lens 112 to liquid crystal panel 115 of the outgoing light beams. That is, second lens 113 deflects each outgoing light beam from first lens 112 in a direction inclined to a predetermined angle. The predetermined angle is an angle at which the outgoing angles are obtained in the central portion and the end of liquid crystal panel 115 as illustrated in FIGS. 3A and 3B. That is, the refractive power of second lens 113 is set such that the outgoing angles are obtained according to virtual image optical system 500. As described above, second lens 113 is not always necessarily provided.

Diffuser 114 weakens directivity of the light beams incident on diffuser 114. In the case that diffuser 114 is not provided, the light beam outgoing from liquid crystal panel 115 has a light distribution characteristic having a peak of the light intensity in the direction corresponding to each of the plurality of light source elements 111. Diffuser 114, when provided, diffuses the light beams incident on liquid crystal panel 115, the light beams are transmitted through liquid crystal panel 115, and the light distribution characteristics of the outgoing light beams is smoothed. The light beam emitted from each of the plurality of light source elements 111 is incident on diffuser 114 at a different angle corresponding to a disposition position of each of light source elements 111. Because the light distribution angle in the X-axis direction of diffuser 114 is a light distribution angle of the outgoing light beam for a combination of the incident light beams from the plurality of light source elements 111 arrayed in the X-axis direction, the light distribution angle in the X-axis direction of diffuser 114 becomes larger than a diffusion characteristic of diffuser 114 itself. Therefore, in the X-axis direction, compared with the Y-axis direction, the light distribution angle can be increased larger than the diffusion characteristic of diffuser 114. The light distribution angle of the outgoing light beam of liquid crystal panel 115 can be controlled by changing the dispositions of the plurality of light source elements 111. A difference in angle incident on diffuser 114 increases by widening a gap between light source elements 111, and an appearance gap between the peaks of light intensity is widened. Accordingly, in the case that an identical number of light source elements 111 is used, the light distribution angle of liquid crystal panel 115 can be increased by widening the gap between light source elements 111 However, it is necessary to widen the gap between light source elements 111 to an extent in which the outgoing light beams of light source elements 111 necessarily enter first lens 112 without being leaked.

Figure 4C:
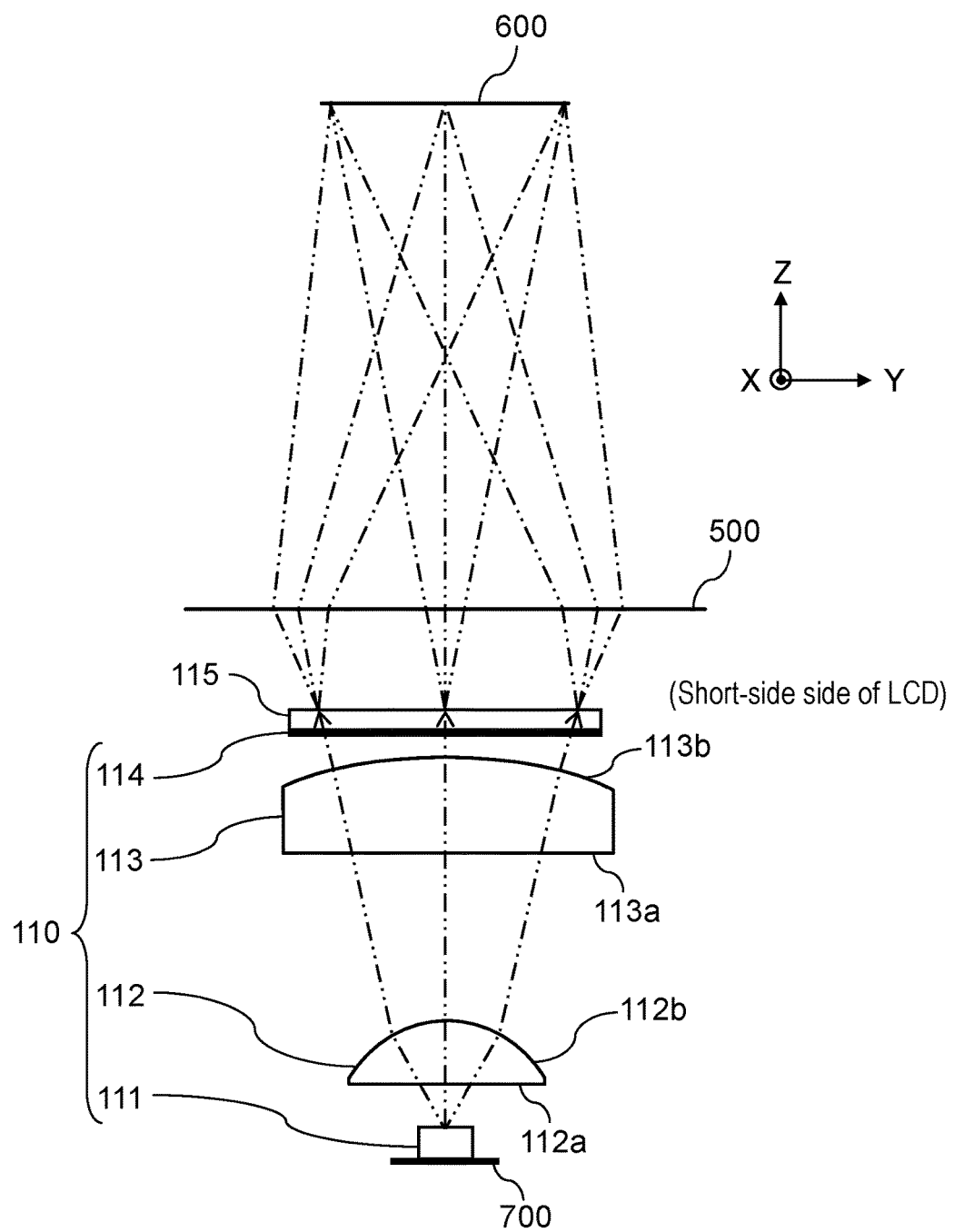
FIG. 4C is a view illustrating the optical paths when the optical paths are viewed from the X-axis direction in the first exemplary embodiment.

FIG. 4C is a view illustrating the optical paths from light source element 111 to eye-box 600 when the optical paths are viewed from the X-axis direction. The outgoing light beams of light source element 111 are incident on first lens 112, and are deflected to an extent in which the outgoing light beams become outward light beams through second lens 113. In the first exemplary embodiment, virtual image 400 includes a long side (a side extending in the longitudinal direction of liquid crystal panel 115) and a short side (a side extending in the crosswise direction of liquid crystal panel 115). In the Y-axis direction indicating a short-side direction of illumination device 110, the refractive powers of first lens 112 and second lens 113 are set such that a light distribution angle of the outgoing light beam of liquid crystal panel 115 is narrowed compared with the X-axis direction.

Diffuser 114 has a function of diffusing and outputting the light beams incident on diffuser 114 according to a predetermined light distribution characteristic (diffusion angle). The light distribution characteristic is set such that the light beams, which are output from diffuser 114 and passed through virtual image optical system 500, finally have a spread corresponding to a width of eye-box 600. In the case that light distribution characteristic is set in diffuser 114 so as to obtain the spread corresponding to the width in the Y-axis direction of eye-box 600, sometimes the smoothing of the angle characteristic in the X-axis direction is not completely accomplished. In this case, an anisotropic material having different diffusion properties (diffusion angles) in the X-axis direction and the Y-axis direction may be used as a material for diffuser 114. The plurality of light source elements 111 may be disposed by adjusting the gap between light source elements 111.

Figure 5A:
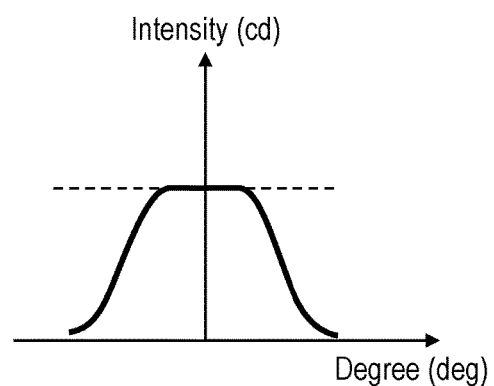
FIG. 5A is a graph (a central portion in the X-axis direction) illustrating an outgoing light beam distribution of the display unit (liquid crystal panel) of the first exemplary embodiment.
Figure 5B:
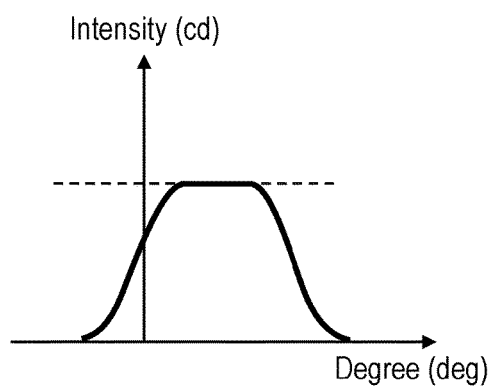
FIG. 5B is a graph (an end in the X-axis direction) illustrating the outgoing light beam distribution of the display unit (liquid crystal panel) of the first exemplary embodiment.
Figure 5C:
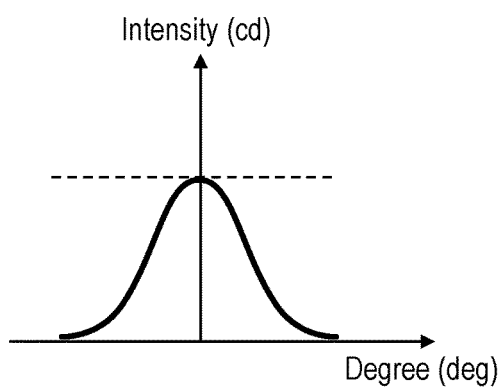
FIG. 5C is a graph (a central portion in the Y-axis direction) illustrating the outgoing light beam distribution of the display unit (liquid crystal panel) of the first exemplary embodiment.

FIG. 5A is a graph illustrating a light distribution characteristic of the outgoing light beam in a central portion of the X-axis direction that is of the longitudinal direction of liquid crystal panel 115 of the first exemplary embodiment. FIG. 5B is a graph illustrating the light distribution characteristic of the outgoing light beam at an end of the X-axis direction that is of the longitudinal direction of liquid crystal panel 115 of the first exemplary embodiment. FIG. 5C is a graph illustrating the light distribution characteristic of the outgoing light beam in the central portion of the Y-axis direction that is of the crosswise direction of liquid crystal panel 115 of the first exemplary embodiment. In the graphs of FIGS. 5A to 5C, a vertical axis indicates light intensity of liquid crystal panel 115 with a unit of candela, and a horizontal axis indicates the light distribution angle of the light beam of liquid crystal panel 115 with a unit of degree.

With reference to FIGS. 5A and 5B, in the central portion of liquid crystal panel 115, the outgoing light beam has a peak intensity of the outgoing light beam in the normal direction of outgoing plane 115b of liquid crystal panel 115. On the other hand, as can be seen from FIGS. 5A and 5B, at the end of liquid crystal panel 115, the outgoing light beam has a peak intensity in a direction inclined toward the outside of liquid crystal panel 115 based on the normal direction. As illustrated in FIGS. 5A and 5C, in liquid crystal panel 115 of the first exemplary embodiment, the light distribution angle in the X-axis direction is larger than the light distribution angle in the Y-axis direction. Therefore, the virtual image having an even luminance distribution in eye-box 600 can visually be recognized in head-up display 100 in which virtual image 400 larger than an area of liquid crystal panel 115 is displayed.

[1-2. Control of Light Source Elements]

Figure 6A:
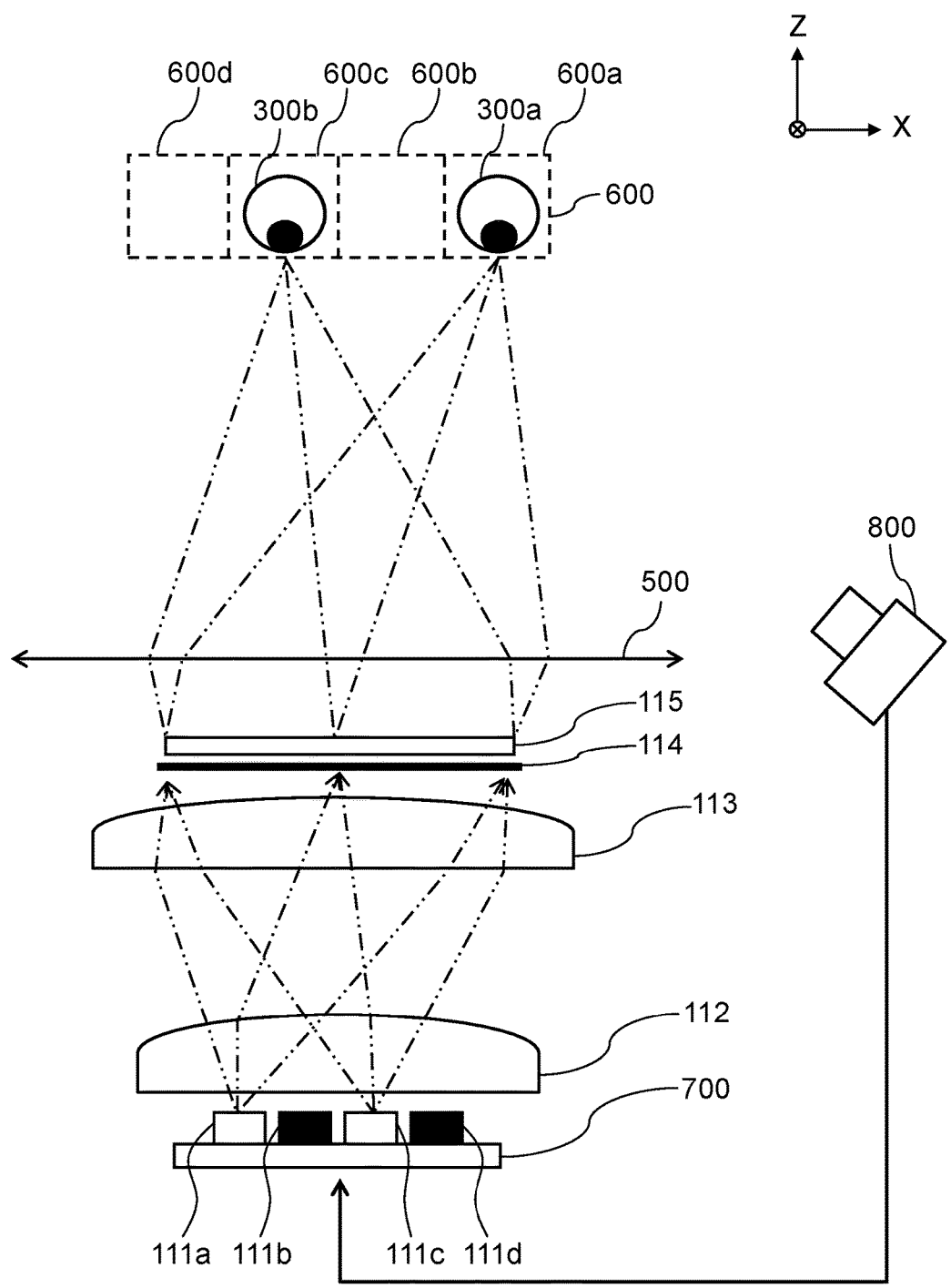
FIG. 6A is a view illustrating the optical paths of the head-up display of the first exemplary embodiment.
Figure 6B:
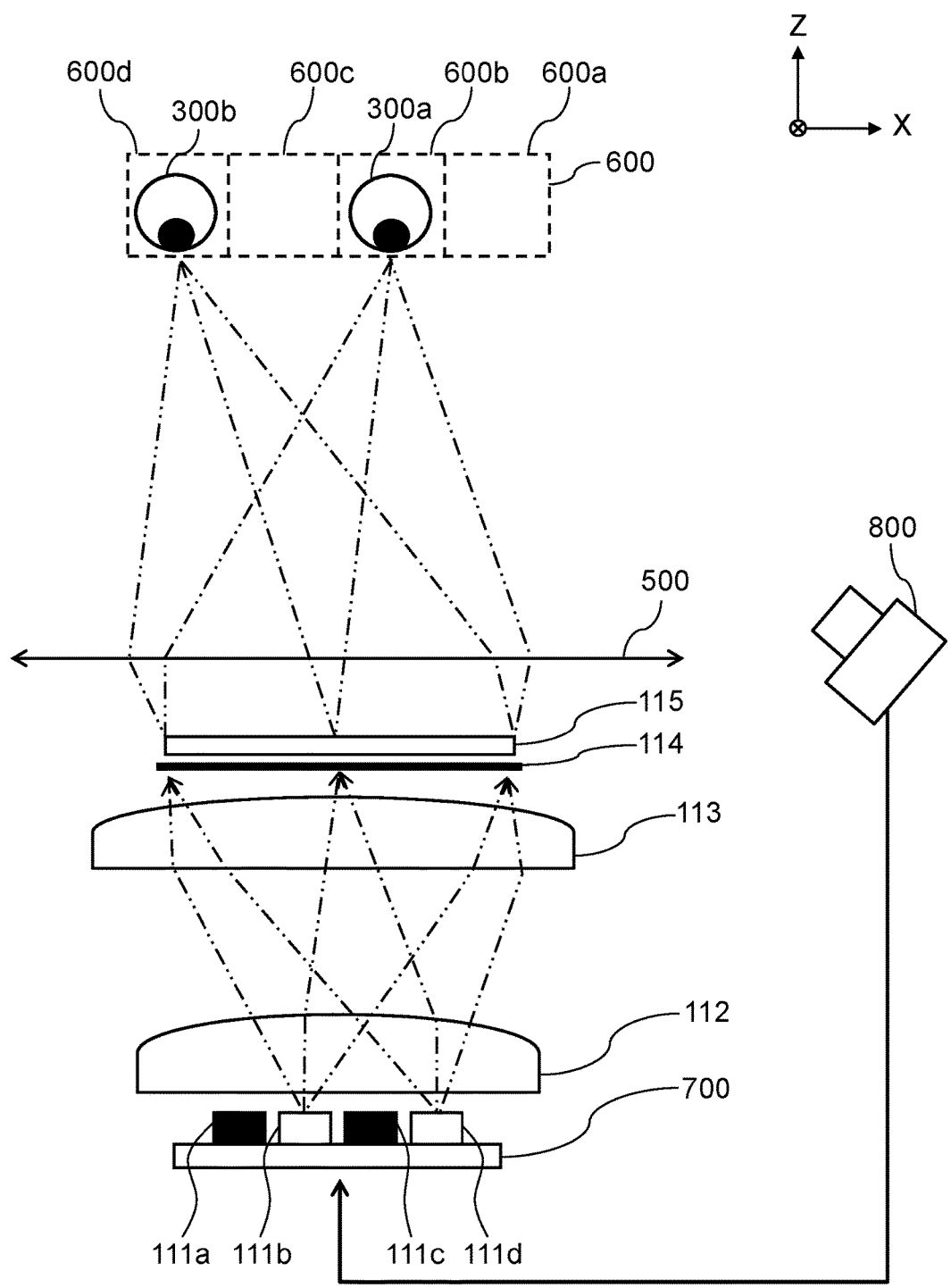
FIG. 6B is a view illustrating the optical paths of the head-up display of the first exemplary embodiment.

Each of FIGS. 6A and 6B is a view schematically illustrating a method for controlling light source elements 111 of head-up display 100 of the first exemplary embodiment. In the first exemplary embodiment, controller 700 controls a lighting state of each of light source elements 111 according to information about the viewpoint position of observer 300, the viewpoint position being obtained by viewpoint detector 800.

The outgoing light beams emitted from light source elements 111a to 111d are respectively incident on positions corresponding to eye-box partial regions 600a to 600d into which eye-box 600 is divided. That is, the light beam of light source element 111a located at the end of light source elements 111 is mainly incident on eye-box partial region 600a located at the end of eye-box 600. The light beam of light source element 111d located at an opposite end to the light source element 111a of light source elements 111 is mainly incident on eye-box partial region 600d located on an opposite end to eye-box partial region 600a of eye-box 600. The position on which the outgoing light beam of each of light source elements 111a to 111d is incident depends on the disposition position of each of light source elements 111a to 111d, and a number of partial regions of eye-box 600 can be identical to a number of light source elements 111.

Viewpoint detector 800 detects which region of eye-box partial regions 600a to 600d the right and left eyes of observer 300 are located. Controller 700 controls light intensity of each of light source elements 111a to 111d according to an eye position of observer 300, the eye position being detected by viewpoint detector 800. For this reason, controller 700 previously includes a table in which light source element 111 to be lit is decided according to the eye position of observer 300, the eye position being detected by viewpoint detector 800. In the first exemplary embodiment, as illustrated in FIG. 6A, in the case that left eye 300a of observer 300 is located in the center of eye-box partial region 600a while right eye 300b of observer 300 is located in the center of eye-box partial region 600c, light source element 111a for left eye 300a is lit, light source element 111c for right eye 300b is lit, and light source elements 111b and 111d are turned off.

The case that the eye positions of observer 300 move from the state in FIG. 6A to the left direction (a negative direction of an X-coordinate) in a paper plane of FIG. 6A will be described. For example, in the case that left eye 300a of observer 300 is located at a boundary between eye-box partial regions 600a and 600b while right eye 300b of observer 300 is located at a boundary between eye-box partial regions 600c and 600d, light source elements 111a and 111b for left eye 300a and light source elements 111c and 111d for right eye 300b are lit with light intensity lower than that of the case that the eye positions of observer 300 are located in the center of the corresponding eye-box partial region.

The case that the eye positions of observer 300 further move from the above state to the left direction (the negative direction of an X-coordinate) in the paper plane will be described. FIG. 6B illustrates the case that the eye positions of observer 300 move such that left eye 300a of the observer is located in the center of eye-box partial region 600b and such that right eye 300b of the observer is located in the center of eye-box partial region 600d. At this point, light source element 111b for left eye 300a and light source element 111d for right eye 300b are lit, and light source elements 111a and 111c are turned off.

In the first exemplary embodiment, the illumination regions of eye-box 600 are changed by controlling the lighting states of light source elements 111. This is because first lens 112 and second lens 113 are configured such that the position in eye-box 600 on which the light beam is incident from each of the plurality of light source elements 111a to 111d differs from each other while each of light source elements 111a to 111d illuminates the whole region of liquid crystal panel 115.

[1-3. Effects and Other Benefits]

As described above, in the first exemplary embodiment, head-up display 100 projects the image onto eye-box 600 of observer 300. Head-up display 100 includes the plurality of light source elements 111, liquid crystal panel 115 (an example of the transmission type display element), first lens 112 (an example of the optical member), viewpoint detector 800, and controller 700. The plurality of light source elements 111 are arranged into an array shape, and output the light beams. Liquid crystal panel 115 displays the image. First lens 112 deflects the light beams emitted from the plurality of light source elements 111 such that the light beams illuminate the identical region in incident plane 115a of liquid crystal panel 115. Viewpoint detector 800 detects the eye position (an example of the viewpoint position) of observer 300. Controller 700 controls the plurality of light source elements 111 according to the eye position of observer 300, the eye position being detected by viewpoint detector 800.

Therefore, only eye-box partial regions 600a and 600c are selectively illuminated by illumination device 110, and observer 300 can visually recognize virtual image 400. On the other hand, eye-box partial regions 600b and 600d where the eye position of the observer is not located is not substantially illuminated, so that power saving is achieved.

Even if the eye is located at a boundary between the eye-box partial regions, observer 300 can visually recognize virtual image 400 without changing the luminance.

Second Exemplary Embodiment

[2-1. Configuration]

Head-up display 100 according to a second exemplary embodiment differs from head-up display 100 of the first exemplary embodiment in that light source element 111 is constructed with nine light source elements 111a to 111i, and head-up display 100 of the second exemplary embodiment is similar to head-up display 100 of the first exemplary embodiment in other configurations. Therefore, the description is omitted.

Figure 7A:
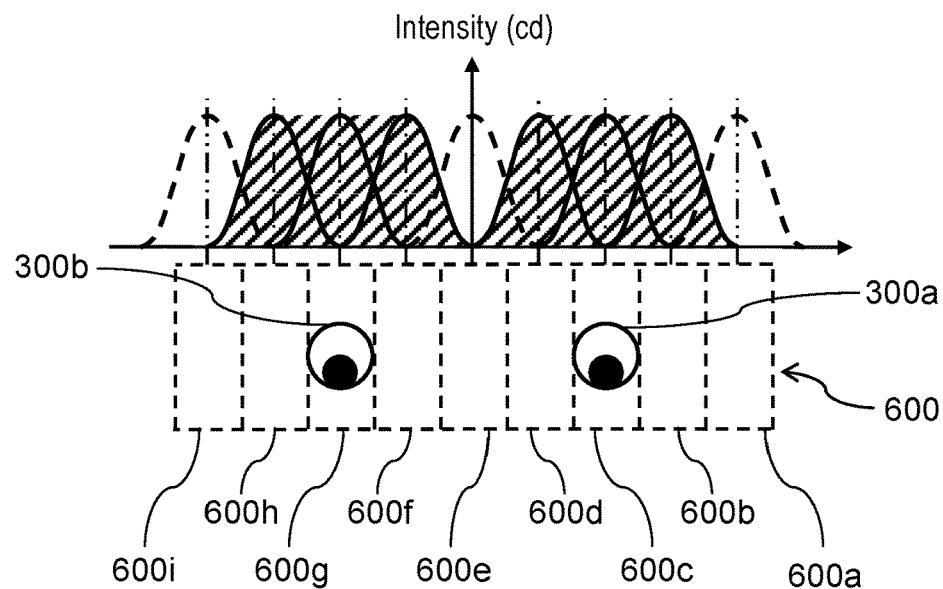
FIG. 7A is a view illustrating lighting control in each region of an eye-box of a second exemplary embodiment.
Figure 7B:
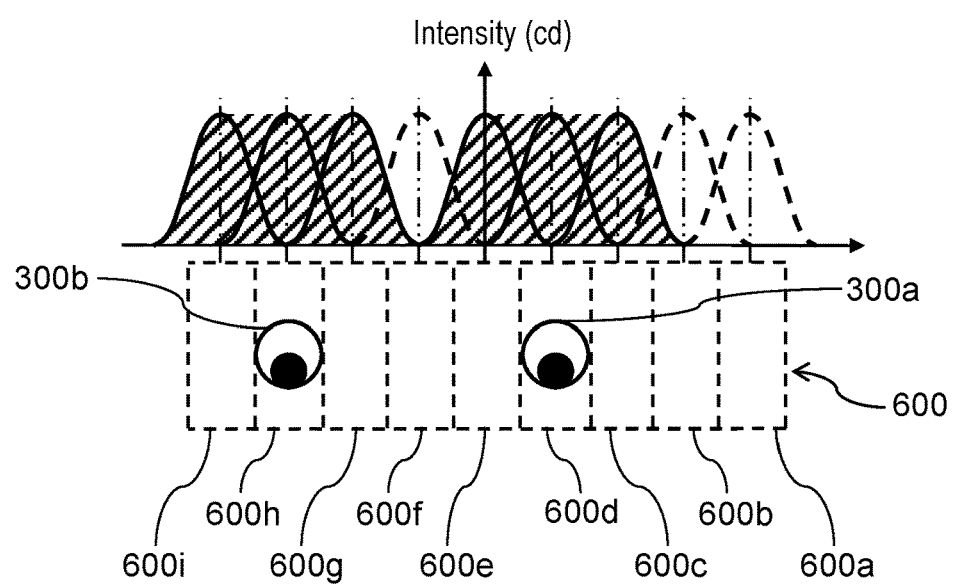
FIG. 7B is a view illustrating the lighting control in each region of the eye-box of the second exemplary embodiment.

Each of FIGS. 7A and 7B is a view illustrating a light intensity distribution in each of eye-box partial regions 600a to 600i. The intensity of the incident light beam from each of light source elements 111a to 111i is maximized in the corresponding region of eye-box partial regions 600a to 600i of eye-box 600. Because light source elements 111a to 111i of head-up display 100 of the second exemplary embodiment are densely disposed, each of the outgoing light beams of light source elements 111a to 111i is incident on not only the corresponding eye-box partial region but also the adjacent eye-box partial regions.

FIG. 7A is a view illustrating the light intensity distribution in eye-box 600 when left eye 300a of observer 300 is located in eye-box partial region 600c while right eye 300b of observer 300 is located in eye-box partial region 600g. At this point, light source elements 111b, 111c, 111d are lit for left eye 300a. Light source elements 111f, 111g, 111h are lit for right eye 300b. At this point, light source elements 111a, 111e, 111i are turned off because the outgoing light beams of light source elements 111a, 111e, 111i are not incident on the viewpoint position of observer 300.

FIG. 7B is a view illustrating the light intensity distribution in eye-box 600 when observer 300 moves from the state in FIG. 7A to the left side in the paper plane. Specifically, the case that left eye 300a of observer 300 moves from eye-box partial region 600c to eye-box partial region 600d while right eye 300b of observer 300 moves from eye-box partial region 600g to eye-box partial region 600h will be described. In this case, when left eye 300a of observer 300 enters eye-box partial region 600d, light source element 111e for left eye 300a is lit in addition to light source elements 111c, 111d. Light source element 111b can be turned off because the outgoing light beam of light source element 111b is not incident on left eye 300a. Similarly, light source element 111i for right eye 300b is lit in addition to light source elements 111g, 111h. Light source element 111f is turned off because the outgoing light beam of light source element 111f is not incident on right eye 300b. That is, light source elements 111a, 111b, 111f can be turned off. The switching between turn-off and lighting has no influence on the luminance of virtual image 400 visually recognized by observer 300, because the number of light source elements that illuminate the viewpoint position of observer 300 does not change when the light source element to be turned off and the light source element to be lit are simultaneously controlled.

[2-2. Effects and Other Benefits]

According to the configuration of the second exemplary embodiment, illumination device 110 selectively illuminates only the eye-box partial regions where the eyes of observer 300 are located, and thus observer 300 can visually recognize virtual image 400. On the other hand, light source elements 111 to illuminate the eye-box partial regions where the eyes of observer 300 are not located are turned off, so that the power saving is achieved.

In FIGS. 7A and 7B, light intensity distribution is indicated by a solid line in each lit light source element 111. The intensity distribution of the light beam incident on eye-box 600 is indicated by a hatched portion. That is, the hatched portion is a combination of the light intensity distributions indicated by the solid lines. As can be seen from the eye positions of observer 300 and the intensity distributions of the hatched portions in FIGS. 7A and 7B, a large change in light intensity around the eyes of observer 300 is suppressed. Therefore, in the case that the control of light source elements 111 incompletely follows the movement of the eyes of observer 300, the change in luminance of virtual image 400 can be suppressed when the virtual image 400 is viewed from observer 300.

Other Exemplary Embodiments

The first and second exemplary embodiments are described above as illustration of the technique disclosed in this application. However, the technique of the present disclosure is not limited to the first and second exemplary embodiments, but is applicable to exemplary embodiments where modifications, replacements, additions, omissions, and the like are appropriately made. Additionally, components described in the first and second exemplary embodiments can be combined to make a new exemplary embodiment. Then, other exemplary embodiments will be described below.

In the first and second exemplary embodiments, liquid crystal panel 115 is used as the spatial light modulation element. However, another display element can be used as long as the display element is a transmission type display device.

By way of example, liquid crystal panel 115 is disposed so as to be orthogonal to the main light beam of light source element 111. Alternatively, liquid crystal panel 115 may be disposed so as not to be orthogonal to the main light beam of light source element 111, but be inclined relative to the main light beam.

A Fresnel lens can be used in the outgoing planes and the incident planes of first lens 112 and second lens 113. Therefore, a thinner lens can be provided.

The focal length of first lens 112 may be set to a value equal to or larger than the distance from the optical center of first lens 112 to outgoing plane 113b of second lens 113 as long as the substantially identical region of liquid crystal panel 115 is illuminated with the outgoing light beams emitted from the plurality of light source elements 111 while the outgoing light beams are superposed on each other. Therefore, the virtual image in which the luminance uniformity is reduced can be generated.

In the first and second exemplary embodiments, one first lens 112 is disposed with respect to the plurality of light source elements 111. Alternatively, a plurality of first lenses may be disposed with respect to the plurality of light source elements 111.

Although the convex lens is used as first lens 112, a total internal reflection (TIR) lens can also be used. Therefore, the light beams can efficiently be emitted from light source elements 111 to second lens 113, and therefore light use efficiency is improved.

In illumination device 110 of the first and second exemplary embodiments, light source elements 111 are disposed in only one line in the Y-axis direction (the crosswise direction of liquid crystal panel 115). Alternatively, in the Y-axis direction, light source elements 111 may be disposed in a plurality of lines.

In the first and second exemplary embodiments, diffuser 114 is disposed between second lens 113 and liquid crystal panel 115. Alternatively, diffuser 114 may be disposed between first lens 112 and second lens 113. Although the efficiency is degraded, the luminance uniformity can be reduced even in this position.

By way of example, windshield 230 is used as the member reflecting the outgoing light beams of head-up display 100. Alternatively, a combiner may be used.

By way of example, the LED is used as the light source. Alternatively, a laser diode or an organic light emitting diode may be used.

In the first and second exemplary embodiments, the head-up display in which the image is observed by using both the eyes is described as the light source control method. However, a head-up display in which the image is observed by using a simple eye can be constructed by performing the similar control. In a conventional simple-eye head-up display device, both the eyes are irradiated with the light beams depending on the eye positions of the observer, and sometimes the virtual image is visually recognized with both the eyes. When the control is performed like the first and second exemplary embodiments, only the simple eye is easy to be illuminated.

Viewpoint detector 800 may detect the eye position by not only directly detecting the eye position but also estimating the eye position from eyebrows, a nose, or an outline of a face.

In the first and second exemplary embodiments, the power saving is achieved by the control of the turn-off and the lighting according to the eye position of the observer. Alternatively, light source elements 111 may be moved according to the eye position of observer 300 for the power saving.

In the second exemplary embodiment, by way of example, the light source elements whose light beams do not reach the eye of observer 300 are turned off. Alternatively, light source elements 111 may be lit while the light intensity of light source elements 111 is lowered. Therefore, the luminance uniformity can be reduced in the case that the eyes of the observer each are located at the boundary portions between the eye-box partial regions.

The display image of liquid crystal panel 115 is time-divided to present different images to the right and left eyes, which allows the observer to recognize a stereoscopic image. In this case, the turn-off and the lighting of the light source elements are controlled such that only the eye-box partial region where the right eye is located is illuminated when the right eye image is displayed. On the other hand, the turn-off and the lighting of the light source elements are controlled such that only the eye-box partial region where the left eye is located is illuminated when the left eye image is displayed, which allows naked eye stereoscopic display.

The moving body on which head-up display 100 of the first and second exemplary embodiments is mounted is not limited to an automobile, but includes a railroad vehicle, a motorcycle, an airplane, a helicopter, a vessel, and various devices that carry people.

INDUSTRIAL APPLICABILITY

The present disclosure is applicable to a projection device that causes an observer to visually recognize a virtual image. Specifically, the present disclosure is applicable to a head-up display and the like.

REFERENCE MARKS IN THE DRAWINGS 100 head-up display
110 illumination device
111 light source element
112 first lens
112a incident plane (of first lens)
112b outgoing plane (of first lens)
113 second lens
113a incident plane (of second lens)

113b outgoing plane (of second lens)
114 diffuser (diffusion member)
115 liquid crystal panel
115a incident plane (of liquid crystal panel)
115b outgoing plane (of liquid crystal panel)
120 display unit
130 reflection optical unit
131 first mirror
132 second mirror
140 housing
141 opening
200 vehicle
230 windshield
300 observer
300a left eye
300b right eye
400 virtual image
500 virtual image optical system
600 eye-box
700 controller

The invention claimed is:

1. A head-up display that projects an image onto an eye-box of an observer, the head-up display comprising:
a plurality of light source elements that are arranged in an array and that emit light beams;
a transmission type display element that displays the image;
an optical member that deflects the light beams emitted from the plurality of light source elements such that an identical region in an incident plane of the transmission type display element is illuminated with the light beams;
a viewpoint detector that detects a viewpoint position of the observer; and
a controller that controls intensity of the light beams of each of the plurality of light source elements according to the viewpoint position detected by the viewpoint detector.

2. The head-up display according to claim 1, wherein a focal length of the optical member is set equal or larger than a value of a distance from an optical center of the optical member to the transmission type display element.

3. The head-up display according to claim 1, wherein the optical member is configured by a lens element.

4. The head-up display according to claim 1, wherein the optical member includes a first lens element and a second lens element disposed on an outgoing plane side of the first lens element.

5. The head-up display according to claim 1, wherein
at least parts of outgoing light beams of the plurality of light source elements are incident on different regions of the eye-box, and
the controller reduces an intensity of a light beam of each of the plurality of light source elements, the light beam being projected onto a region where the viewpoint position of the observer in the eye-box does not exist, in the plurality of light source elements.

6. The head-up display according to claim 1, wherein, when the viewpoint position of the observer is located at a boundary of a plurality of regions in the eye-box, the controller lowers an intensity of an outgoing light beam of each of plurality of the light source elements compared with when the viewpoint position of the observer is not located at the boundary of the plurality of regions in the eye-box.

7. The head-up display according to claim 1, wherein the head-up display is mounted on a moving body including a windshield.

8. A moving body on which the head-up display according to claim 1 is mounted.

* * * * *